(12) United States Patent
Vachon

(10) Patent No.: US 9,435,476 B2
(45) Date of Patent: Sep. 6, 2016

(54) TUBING CONNECTOR SYSTEM

(71) Applicant: LE GROUPE DSD INC., Thetford Mines (CA)

(72) Inventor: Leandre Vachon, Thetford Mines (CA)

(73) Assignee: LE GROUPE DSD INC., Thetford Mines, Quebec (CA)

( * ) Notice: Subject to any disclaimer, the term of this patent is extended or adjusted under 35 U.S.C. 154(b) by 0 days.

(21) Appl. No.: 14/733,002

(22) Filed: Jun. 8, 2015

(65) Prior Publication Data

US 2015/0377399 A1 Dec. 31, 2015

(30) Foreign Application Priority Data

Jun. 26, 2014 (CA) .................................... 2855396

(51) Int. Cl.
*F16L 41/12* (2006.01)
*A01G 23/14* (2006.01)

(52) U.S. Cl.
CPC ............... *F16L 41/12* (2013.01); *A01G 23/14* (2013.01)

(58) Field of Classification Search
CPC ....... F16L 41/12; F16L 41/16; A01G 123/14
USPC ......................................... 285/197, 198, 199
See application file for complete search history.

(56) References Cited

U.S. PATENT DOCUMENTS

| | | | |
|---|---|---|---|
| 684,084 A | 10/1901 | Mueller | |
| 785,737 A | 3/1905 | Jones | |
| 852,682 A | 5/1907 | Schuermann | |
| 1,185,927 A | 6/1916 | O'Brien | |
| 1,186,741 A | 6/1916 | Brower | |
| 1,191,887 A * | 7/1916 | Glauber | F16L 41/06 285/199 |
| 1,198,528 A | 9/1916 | Deitz | |
| 1,294,052 A * | 2/1919 | Clark | B67D 1/0835 285/199 |
| 1,459,030 A | 6/1923 | Mueller | |

(Continued)

FOREIGN PATENT DOCUMENTS

| | | |
|---|---|---|
| CA | 2308726 A1 | 11/2001 |
| DE | 2454833 A1 | 5/1976 |

(Continued)

OTHER PUBLICATIONS

Machine translation in English of DE-2454833 A1.

(Continued)

*Primary Examiner* — David E Bochna
(74) *Attorney, Agent, or Firm* — IPAXIO S.E.N.C.

(57) ABSTRACT

The tubing connector system (100) provides a removable air-tight and water-tight sealing connection under vacuum conditions between an end portion (102) of a flexible tubing (104) and a tapping hole (108) on a main conduit (106). It includes a single screw-type clamp (120) having an adjustable tension mechanism (122) and a flexible metallic band (124) cooperating with the adjustable tension mechanism (122), a tube fitting (150), and a resilient gasket (180), to be interposed between an outer surface of the main conduit (106) and the inner side face of a flange (170) provided on the tube fitting (104), to seal a space immediately surrounding a tapping-hole engaging portion (162) on the tube fitting (104) when brought into cooperative engagement with the inner periphery of tapping hole (108). The sealing attachment can be created very quickly, even by an unexperienced operator, using parts that are relatively inexpensive and simple.

21 Claims, 6 Drawing Sheets

(56) References Cited

U.S. PATENT DOCUMENTS

| | | | |
|---|---|---|---|
| 2,693,975 A | 11/1954 | Smith | |
| 2,703,721 A | 3/1955 | Montgomery | |
| 2,788,231 A | 4/1957 | Crow | |
| 2,877,601 A | 3/1959 | Griggs | |
| 2,881,010 A * | 4/1959 | Bouma | A01J 5/044 251/127 |
| 2,884,265 A | 4/1959 | Boughton | |
| 2,944,369 A | 7/1960 | Soule | |
| 2,945,277 A | 7/1960 | Wiora | |
| 2,958,158 A | 11/1960 | Hatton | |
| 2,993,256 A | 7/1961 | Muhlegg | |
| 2,997,316 A | 8/1961 | Recht | |
| 3,046,698 A | 7/1962 | Breen et al. | |
| 3,057,115 A | 10/1962 | Bilanin | |
| 3,132,881 A | 5/1964 | Corey | |
| 3,156,069 A | 11/1964 | Lamb | |
| 3,204,370 A | 9/1965 | Lamb | |
| 3,272,471 A * | 9/1966 | McCullah | A01J 5/044 137/300 |
| 3,298,717 A | 1/1967 | Rothwell et al. | |
| 3,331,622 A | 7/1967 | Bagnulo | |
| 3,349,792 A * | 10/1967 | Larkin | B23B 51/044 285/197 |
| 3,355,193 A | 11/1967 | Craig et al. | |
| 3,469,344 A | 9/1969 | Garvey | |
| 3,480,252 A | 11/1969 | Simons | |
| 3,635,503 A | 1/1972 | Rafalski, Jr. | |
| 3,687,490 A | 8/1972 | Dunmire | |
| 3,694,009 A | 9/1972 | Phillips | |
| 3,762,743 A | 10/1973 | Hawle | |
| 3,779,272 A | 12/1973 | Dunmire | |
| 3,863,937 A | 2/1975 | Silverman et al. | |
| 3,866,879 A | 2/1975 | Elizondo et al. | |
| 4,123,035 A | 10/1978 | Boudreau | |
| 4,135,258 A * | 1/1979 | Braga | E03C 1/2665 285/197 |
| 4,158,461 A | 6/1979 | Francis | |
| 4,299,053 A | 11/1981 | Foote | |
| 4,366,648 A | 1/1983 | Morin | |
| 4,512,104 A | 4/1985 | Lamb | |
| 4,638,834 A * | 1/1987 | Montgomery | F16L 41/06 285/197 |
| 4,752,387 A | 6/1988 | Thomas | |
| 4,801,886 A * | 1/1989 | Steininger | G01N 27/4168 285/197 |
| 4,884,365 A | 12/1989 | Lesquir | |
| 4,887,387 A | 12/1989 | Lesquir | |
| 4,966,397 A | 10/1990 | McKinnon | |
| 5,020,832 A | 6/1991 | Coblentz | |
| 5,054,820 A * | 10/1991 | Lesquir | F16L 41/12 285/197 |
| 5,123,627 A * | 6/1992 | Hodges | F16L 41/16 285/197 |
| 5,169,177 A | 12/1992 | McLennan et al. | |
| 5,170,813 A | 12/1992 | Francis | |
| 5,247,967 A | 9/1993 | Bourque | |
| 5,303,504 A | 4/1994 | Buzzell | |
| 5,360,241 A * | 11/1994 | Gundy | F16L 41/12 285/197 |
| 5,497,808 A | 3/1996 | Schlund et al. | |
| 5,504,978 A | 4/1996 | Meyer, III | |
| 5,706,862 A | 1/1998 | Meinerding, Sr. | |
| 5,971,001 A * | 10/1999 | Andersson | F16L 41/06 285/197 |
| 6,334,465 B2 | 1/2002 | Boulet D'Auria | |
| 6,340,059 B1 * | 1/2002 | Bethea | A62C 31/02 285/198 |
| 6,438,895 B1 | 8/2002 | Fortier | |
| 6,454,312 B1 | 9/2002 | Desorcy et al. | |
| 6,578,877 B1 * | 6/2003 | Sundholm | F16L 41/06 285/197 |
| 6,588,767 B2 * | 7/2003 | Kane | F16L 41/04 285/197 |
| 6,594,869 B1 | 7/2003 | Chen | |
| 7,219,684 B2 | 5/2007 | Dabir et al. | |
| 7,992,594 B2 | 8/2011 | Bowie | |
| 8,359,788 B2 | 1/2013 | Leger et al. | |
| 8,539,712 B2 | 9/2013 | Perkins | |
| 8,677,682 B2 | 3/2014 | Cote et al. | |
| 2013/0264815 A1 | 10/2013 | Boulet D'Auria | |
| 2015/0289457 A1 | 10/2015 | Vachon | |

FOREIGN PATENT DOCUMENTS

| | | | | |
|---|---|---|---|---|
| DE | 19514498 C2 | | 10/1996 | |
| EP | 2591270 B1 | | 7/2015 | |
| FR | 1368381 A | * | 7/1964 | F16L 41/12 |
| FR | 2809471 B1 | | 11/2001 | |
| FR | 2933764 B1 | | 1/2010 | |
| GB | 268923 A | | 7/1927 | |

OTHER PUBLICATIONS

Machine translation in English of DE-19514498 C2.
Machine translation in English of EP-2591270 B1.
Machine translation in English of FR-2809471 B1.
Machine translation in English of FR-2933764 B1.

* cited by examiner

TUBING CONNECTOR SYSTEM

CROSS-REFERENCE TO RELATED APPLICATION

The present case claims the benefit of Canadian patent application No. 2,855,396 filed on 26 Jun. 2014, which application is hereby incorporated by reference in its entirety.

TECHNICAL FIELD

The technical field relates generally to tubing connector systems for sealingly attaching an end portion of flexible tubings to corresponding tapping holes on main conduits, in particular flexible tubings and main conduits that are part of sap collecting networks operable under vacuum conditions.

BACKGROUND

Many different systems and arrangements have been proposed over the years for harvesting and collecting sap from trees. Sap is generally harvested using spouts, also sometimes referred to as splines, which are inserted into corresponding tapped holes made on the trunks of trees. The sap flows out of the trees through the spouts and is further collected thereafter. Some implementations use buckets or the like in which the sap can drip by gravity and accumulate underneath the spouts. However, most commercial implementations now use a network of sap collecting conduits operable under vacuum conditions. The sap flowing out of each spout is carried by the network of conduits to a given destination, for example a sap processing unit or to a sap storage unit. The sap processing unit and/or the sap storage unit can be located in a sugarhouse, for instance. The vacuum conditions can be created using, for example, one or more air pumps provided at or near the downstream end of the network of conduits. Variants are possible as well.

Once collected, water can be removed from the sap to concentrate the high-sugar content therein and the concentrated sap can be transformed into various products. For instance, most of the sap from sugar maple trees of a sugar bush can be transformed into food products such as maple syrup. A similar process can be carried out using sap from other kinds of trees, for instance yellow birch, cherry birch, hickory, basswood, etc. Maple trees are thus not the only kinds of trees from which sap could be collected.

Some sugar bushes may include a sap collecting network having one or more main tube or pipes (hereafter generically referred to as a "main conduit") to which are coupled a number of flexible tubings of smaller diameter so to create fluid circuits establishing a fluid communication between the various spouts located in the sugar bush and a downstream end of the main conduit. In use, when the interior of the main conduit is under vacuum conditions, the sap flowing out of a tree through a corresponding spout enters a fluid circuit including one or more flexible tubings ending into the main conduit at a corresponding tapping hole. These flexible tubings have one end portion that is sealingly attached to the tapping hole. The flexible conduits can extend between a single spout and the main conduit or, more often, be part of a subsection of the network where a number of flexible tubings having one or more embranchments interconnect a plurality of spouts to the last flexible tubing of the subsection.

The total number of tapping holes in a single sap collecting network can be quite large when the size of the sugar bush is relatively important. The total costs of the hardware required for sealingly attaching the end portions of flexible tubings to a main conduit of the network can require a substantial upfront investment, especially for medium and large scale sugar bushes, considering the number of connectors involved. Still, it is always desirable to minimize the time and the complexity for making each connection so as to lower the operational costs.

Another challenge is that vacuum pumps that are available for use on a network of conduits are increasingly powerful. The negative pressures created by some of these vacuum pumps are now about twice what was possible to obtain a few years ago. These high vacuum conditions require the use of better connectors and related hardware. The small air leaks at the various junctions, for instance between the main conduit at the junctions of mating parts, can cause bacteria to enter. Small air leaks can also cause the sap to freeze when operating slightly under a freezing temperature and therefore prevent some sections of the network, or even the entire network, from working.

Existing arrangements are not entirely satisfactory. For instance, some are too costly and/or difficult to manufacture, some are too difficult to install and/or require too much time for completing each connection, and/or some are not capable of providing an optimum sealing between the parts under high vacuum conditions.

Clearly, room for many improvements still exists in this technical area.

SUMMARY

In one aspect, there is provided a tubing connector system for providing a removable air-tight and water-tight sealing connection under high vacuum conditions between an end portion of a flexible tubing and a tapping hole on a main conduit, the tubing connector system including: a single screw-type clamp having an adjustable tension mechanism and a flexible band cooperating with the adjustable tension mechanism, the band forming a circular loop encompassing the main conduit and having opposite inner and outer side faces, the screw-type clamp including an opening, extending between the inner and outer side faces of the band, to be positioned in registry with the tapping hole; a tube fitting forming an internal fluid circuit extending between a tubing fixation portion, over which the end portion of the flexible tubing can be removably inserted with a frictional engagement, and a tapping-hole engaging portion, opposite the tubing fixation portion, and that can be brought into cooperative engagement with an inner peripheral surface of the tapping hole, the tube fitting including a deformable surrounding flange extending radially outward and located adjacent to the tapping-hole engaging portion, the flange having inner and outer side faces with the outer side face being engageable by an area on the inner side face of the band that surrounds the band opening, the flange being larger in width than the band opening; and a resilient gasket to be interposed between an outer wall surface of the main conduit and the inner side face of the flange to seal a space immediately surrounding the tapping-hole engaging portion when brought into cooperative engagement with the tapping hole inner periphery.

In another aspect, there is provided a method of sealingly attaching an end portion of a flexible tubing to a tapping hole on a main conduit, as shown and/or described and/or suggested herein.

Details on the various aspects of the proposed concept will be apparent from the following detailed description and the appended figures.

DETAILED DESCRIPTION

Figure 1:
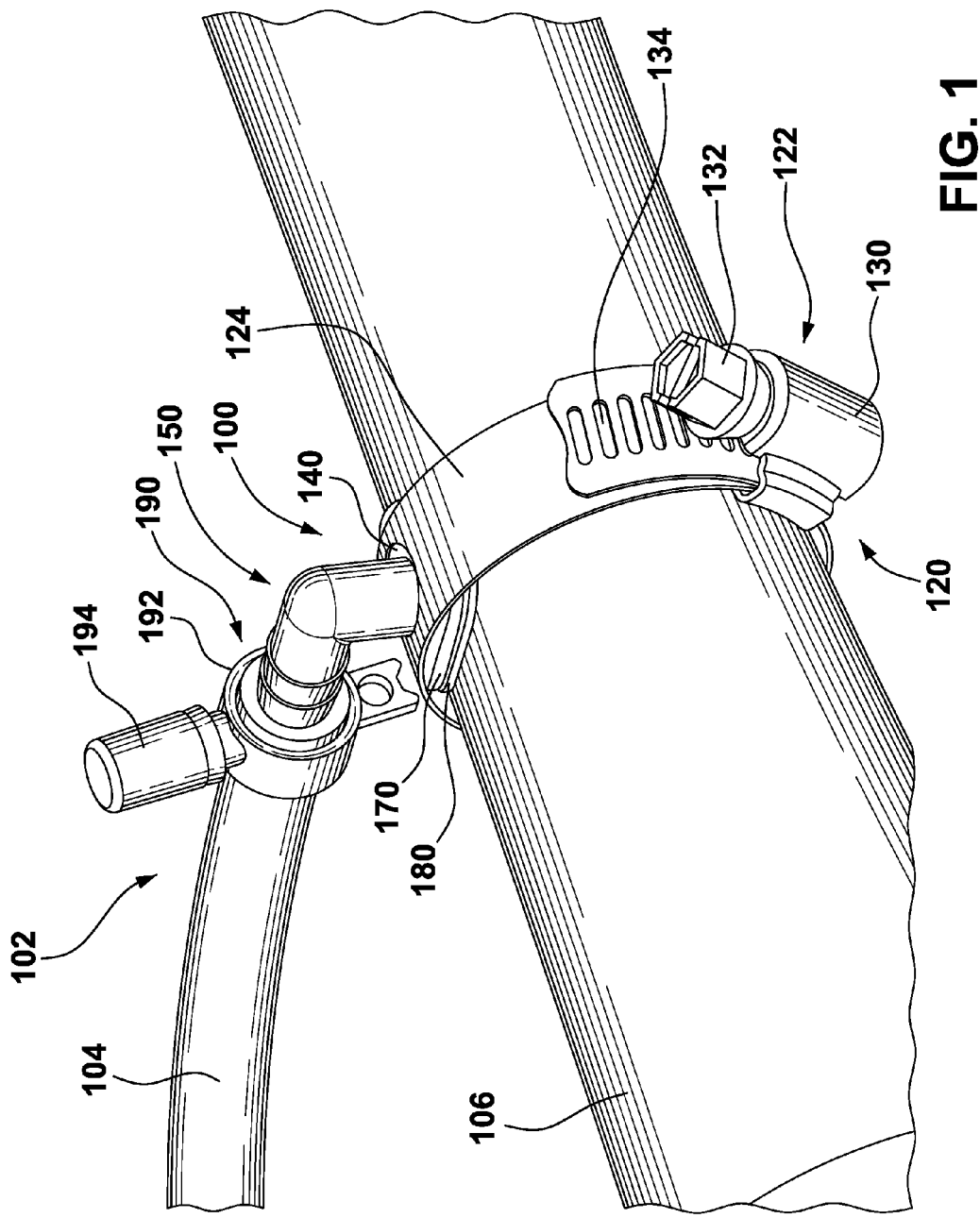
FIG. 1 is an isometric view illustrating an example of a tubing connector system as proposed herein, the tubing connector system being sealingly attached to a tapping hole provided on an example of a main conduit.
Figure 5:
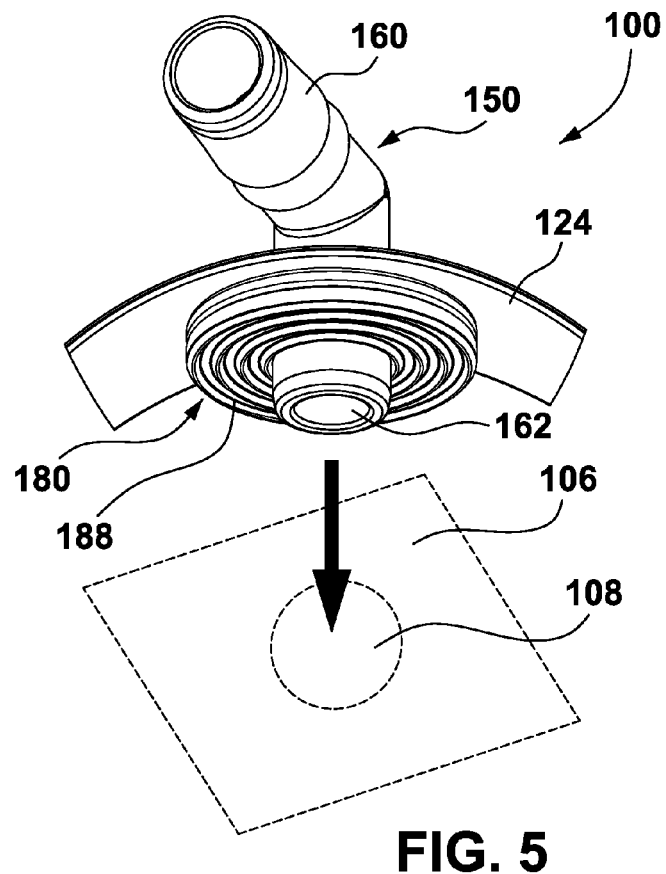
FIG. 5 is an enlarged isometric and semi-schematic view of the inner side of the tubing connector system shown in FIG. 4.

FIG. 1 is an isometric view illustrating an example of a tubing connector system 100 as proposed herein. This tubing connector system 100 is provided for sealingly attaching an opened end portion 102 of a flexible tubing 104 to a main conduit 106. It creates a removable air-tight and water-tight sealing connection, even under high vacuum conditions, between the flexible tubing 104 and the main conduit 106. The interior of the flexible tubing 104 is made in fluid communication with the interior of the main conduit 106 through a tapping hole extending substantially radially across the wall of the main conduit 106. The tapping hole is not visible in FIG. 1 but is schematically represented in FIG. 5 at 108. Tapping holes are generally made on the top of main conduits but variants are possible. The present text assumes the tapping hole 108 is made on the top but this is only for the sake of simplicity. The proposed concept is not limited to tapping holes exclusively on the top.

The tubing connector system 100 is particularly useful for use in a network of conduits installed in a sugar bush or a similar location where sap is collected and where a large number of flexible tubings must be sealingly attached to corresponding tapping holes provided on one or more main conduits.

In a sugar bush, the main conduit 106 is often made of a thermoplastic material, for instance Acrylonitrile butadiene styrene (ABS) or the like. ABS tubes have good mechanical properties and are widely available at a relatively low cost. They have some degree of flexibility and can be installed relatively easily over the ground surface of a wooded area. The wall of a main conduit made of ABS can be relatively easily pierced by an operator, using for instance a drill bit and a hand-carried power drill, so as to create the tapping hole 108.

It should be noted that ABS is not the only possible material for a main conduit such as the illustrated main conduit 106. Other thermoplastic materials can be used as well. Still, one could use composite material and/or materials that are not plastics for making the main conduit 106. The exact material for making the main conduit 106 would be known to a person skilled in the art and need not to be discussed further herein.

As can be seen in FIG. 1, the tubing connector system 100 includes a single screw-type clamp 120. The screw-type clamp 120 has an adjustable tension mechanism 122 and a flexible band 124 cooperating with the adjustable tension mechanism 122. The band 124 forms a single and relatively narrow circular loop encompassing the outer wall surface of the main conduit 106. The band 124 also has opposite inner and outer side faces. Most of its inner side face directly engages the outer wall surface of the main conduit 106. The band 124 and/or the other parts of the screw-type clamp 120 can be made of metal, for instance stainless steel, but other materials would be possible as well.

In the illustrated example, the adjustable tension mechanism 122 includes a housing 130 that is rigidly attached at or near one end of the band 124. The housing 130 pivotally supports a worm screw 132 disposed tangentially with reference to the band 124. The shank of the screw 132 includes threads cooperating with a series of equally-spaced and slightly obliquely-disposed transversal slots 134 provided at least along an area at the end of the band 124 that is opposite the end where the housing 130 is attached. This opposite end is slidingly inserted through a substantially tangential aperture below the housing 130 so that the slots 134 be engaged by the threads of the screw 132. The head of the screw 132 protrudes from on side of the housing 130 and can be rotated using a tool, for instance a screwdriver or the like, to change the diameter of the screw-type clamp 120.

Many screw-type clamp models exist and they are widely used, for instance in general pluming. They are thus easily available and can be mass-produced at a relatively low cost. Some screw-type clamps can be slightly different compared to the one illustrated herein and accordingly, the screw-type clamps for use with tubing connector systems of the proposed concept need not be exactly as shown.

Another interesting feature of many screw-type clamp models, including the one illustrated herein, is than the end of the band 124 that is slidably engaged through the housing 130 can be detached from the housing 130 and its corresponding screw 132. This way, one can open the band 124 to install the screw-type clamp 120 over the main conduit 106. The band 124 is wrapped around the outer wall surface of the main conduit 106 and then closed by reinserting the end back through the housing 130 and into engagement with the screw 132. Tightening the band 124 to decrease the diameter will generate a radially-inward pressure, underneath the inner side face of the band 124, over the outer wall surface of the main conduit 106.

Unlike common screw-type clamps, the screw-type clamp 120 of the tubing connector system 100 includes an opening 140, extending between the inner and outer side faces of the band 124, that will be positioned in registry with the tapping hole 108.

This band opening 140 is circular in cross section in the illustrated example but variants are possible. The opening 140 is at least as large as the tapping hole 108 in most implementations.

The tubing connector system 100 further includes a tube fitting 150 to create the fluid communication between the interior of the flexible tubing 104 and the interior of the main conduit 106. This tube fitting 150 can be made, for instance, of a monolithic piece of plastic, such as one manufactured using injection molding or the like. Nevertheless, other materials, configurations and/or manufacturing methods can be used as well.

Figure 2:
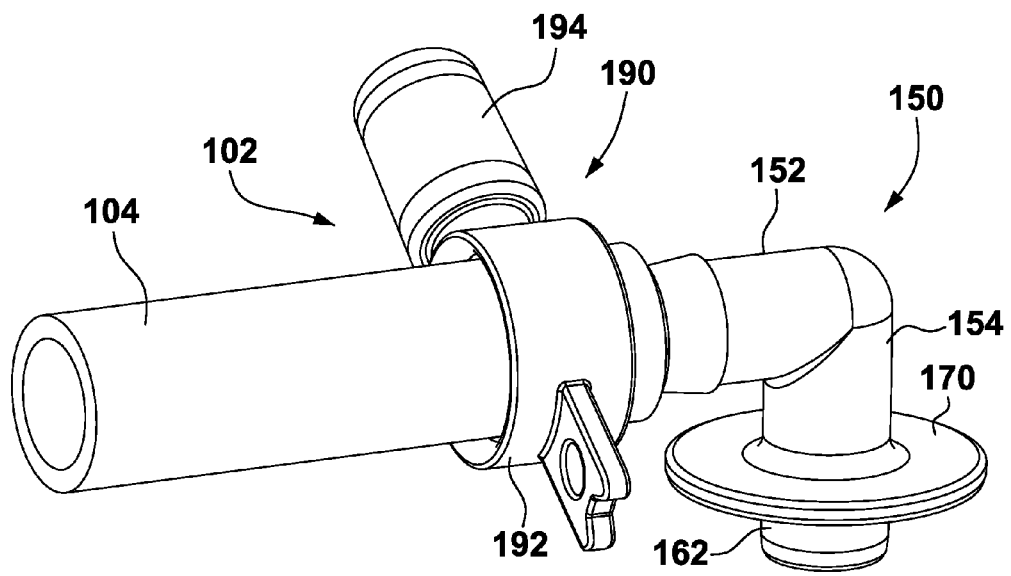
FIG. 2 is an enlarged isometric view of the tube fitting of the tubing connector system in FIG. 1 and to which the end portion of the flexible tubing is attached.
Figure 3:
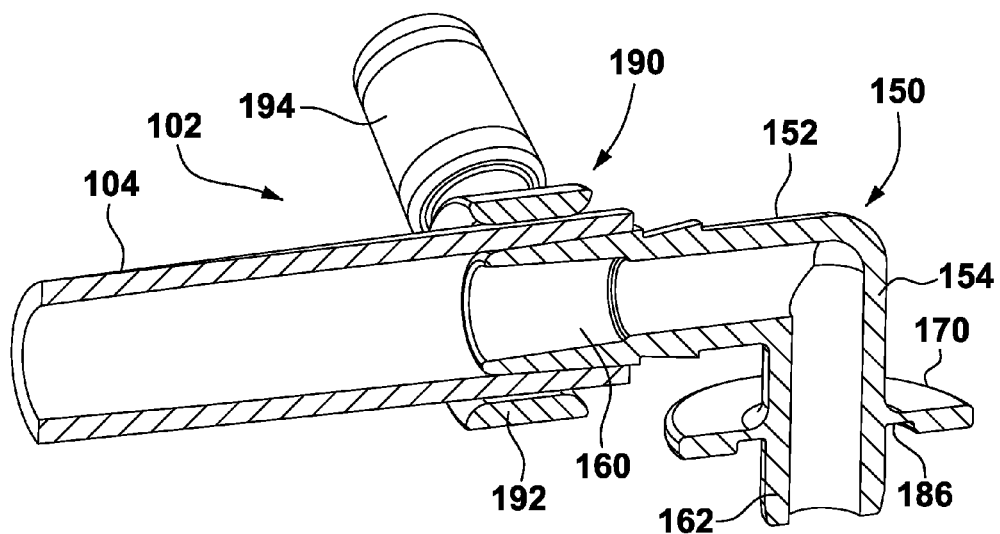
FIG. 3 is a longitudinal cross-sectional view of the parts shown in FIG. 2.

The illustrated tube fitting 150 includes first and second tube sections 152, 154 forming an internal fluid circuit extending between a tubing fixation portion 160, located at an open end of the first tube section 152 and over which the end portion 102 of the flexible tubing 104 can be removably inserted with a frictional engagement, and a tapping-hole engaging portion 162. The tapping-hole engaging portion 162 can be seen for instance in FIGS. 2 and 3. FIG. 2 is an enlarged isometric view of the tube fitting 150 of the tubing connector system 100 in FIG. 1 and to which the end portion 102 of the flexible tubing 104 is attached. FIG. 3 is a longitudinal cross-sectional view of the parts shown in FIG. 2.

The tapping-hole engaging portion 162 is opposite the tubing fixation portion 160 and is located at an open end of the second tube section 154. The tapping-hole engaging portion 162 can be brought into cooperative engagement with an inner peripheral surface of the tapping hole 108. The outer surface of the tapping-hole engaging portion 162 has a circular cross section to fit very tightly with the inner peripheral surface of the tapping hole 108. If desired, the outer surface of the tapping-hole engaging portion 162, or a portion thereof, can have a slightly tapered shape to facilitate the insertion into the tapping hole 108. Variants are possible as well.

In the illustrated example, the first and second tube sections 152, 154 are each extending along a corresponding center axis that is substantially rectilinear. These two center axes are also disposed substantially perpendicular to one another and the tube fitting 150 forms an elbow. Variants are possible as well. For instance, the angle between the center axes of the two tube sections 152, 154 can be more or less than 90 degrees. Still, one can have more than two tube sections, or even a single tube section, for instance a rectilinear one. The single tube section or at least one among the plurality of tube sections can be curved. Other variants are possible.

The second tube section 154 includes a deformable surrounding flange 170 extending radially outward and located adjacent to the tapping-hole engaging portion 162. This flange 170 is substantially annular in shape in the illustrated example but variants are possible. The flange 170 has inner and outer side faces.

The material for the flange 170 can be the same material used for the other parts of the tube fitting 150 but the flange 170 can be designed with a thickness at which the material can deform without cracking. Preferably, the deformation is a resilient deformation. Variants are possible as well.

In the assembled configuration of the tubing connector system 100, as shown in FIG. 1, the tube fitting 150 passes through the band opening 140. The flange 170 and the tapping-hole engaging portion 162 are positioned on the inner side of the band 124 and the rest of the tube fitting 150 projects out of the band opening 140 on the outer side of the band 124. The flange 170 is larger in width than the band opening 140 so as to prevent it from passing through the band opening 140. In the illustrated example, the first tube section 152 and the second tube section 154, up to its flange 170, are smaller in width (in this case in diameter) than the band opening 140. This allows insertion of the tube fitting 150 from the interior of the band 124. The outer side face of the flange 170 is engageable by an area on the inner side face of the band 124 that surrounds the band opening 140. Variants are possible.

The tubing connector system 100 further includes a resilient gasket 180 to be interposed between the outer wall surface of the main conduit 106 and the inner side face of the flange 170. This gasket 180 is made of a relatively soft and compressible material, for instance a rubber-like material or another kind of polymeric material. Other materials are possible.

The gasket 180 is provided for sealing the space immediately surrounding the tapping-hole engaging portion 162 when the latter is brought into cooperative engagement with the tapping hole inner periphery. The gasket 180 ensures an air-tight and water-tight seal preventing air and other contaminants from entering between the outer surface of the tapping hole engaging portion 162 and the tapping hole inner periphery on the main conduit 106. The gasket 180 is substantially annular in shape. It has a width that is substantially equivalent to that of the flange 170. Also, the thickness of the gasket 180 is less than the length of the tapping hole engaging portion 162. The center opening of the gasket 180 is sized to fit tightly around the outer surface of the tapping-hole engaging portion 162.

Figure 4:
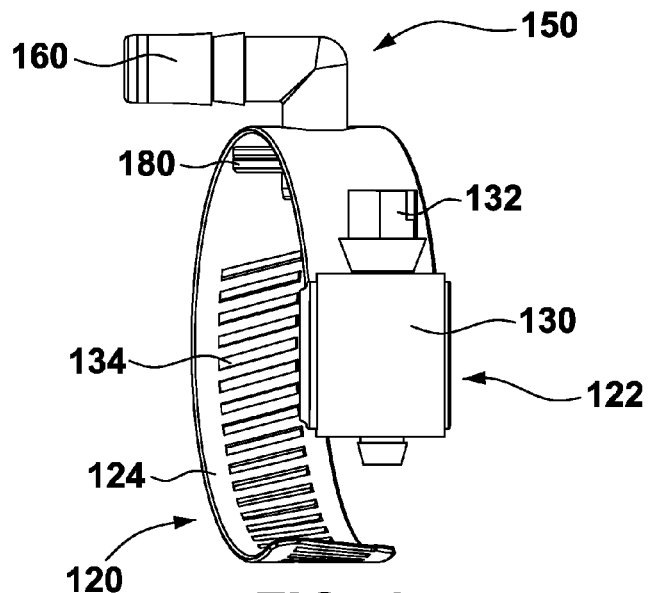
FIG. 4 is an isometric side view of the screw-type clamp, with its corresponding tube fitting, of the tubing connector system in FIG. 1.
Figure 6:
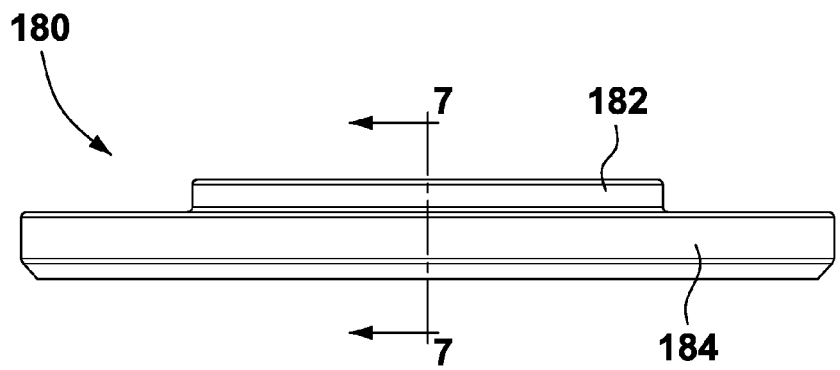
FIG. 6 is an enlarged side view of the resilient gasket of the tubing connector system shown in FIG. 4.
Figure 7:
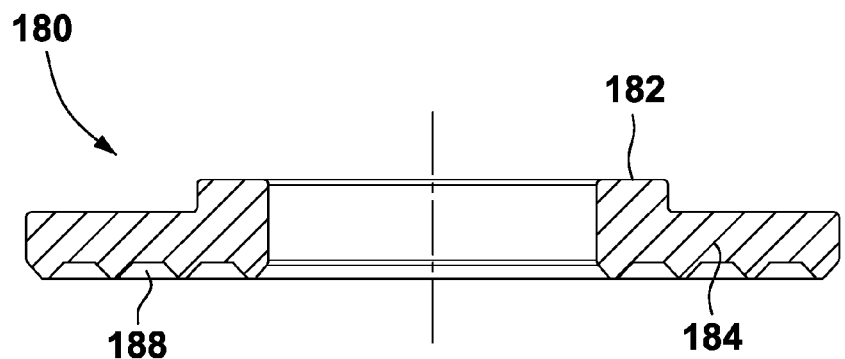
FIG. 7 is a cross-sectional view of the gasket taken along line 7-7 in FIG. 6.

A portion of the outer side edge of the gasket 180 can be seen in FIG. 1. The gasket 180 can also be seen in FIGS. 4 to 7. FIG. 4 is an isometric side view of the screw-type clamp 120, with the corresponding tube fitting 150, of the tubing connector system 100 in FIG. 1. FIG. 5 is an enlarged isometric and semi-schematic view of the inner side of the tubing connector system 100 shown in FIG. 4. FIG. 6 is an enlarged side view of the resilient gasket 180 of the tubing connector system 100 shown in FIG. 4. FIG. 7 is a cross-sectional view of the gasket 180 taken along line 7-7 in FIG. 6.

It should be noted that the length of the band 124 shown in FIG. 4 has been shorten for the sake of illustration.

As can be seen in FIG. 5, a tip part of the tapping hole engaging portion 162 projects under the gasket 180 when the gasket 180 is in position against the inner side face of the flange 170. This projecting tip part of the tapping hole engaging portion 162 will penetrate the tapping hole 108 when the connection is made.

The illustrated gasket 180 includes an inner section 182 and an outer section 184. Both are coaxially disposed around a center axis. The thickness of the gasket 180 is greater at the inner section 182 than that at the outer section 184, as can be seen in FIGS. 6 and 7. The portion of the inner section 182 projecting above the gasket 180 is designed to fit into an annular groove 186 (FIG. 3) made on the inner side face of the flange 170. This configuration helps keeping the gasket 180 well centered on the tube fitting 150. Variants are possible as well.

As best shown in FIG. 7, the gasket 180 of the illustrated example includes a plurality of coaxially-disposed annular grooves 188 on its inner side face. There are three grooves 188 in the example. These grooves 188 are molded in the material to create a series of lips, four in the gasket 180 shown, that are spaced-apart from one another. This promotes a tighter sealing engagement with the generally rough outer wall surface of the main conduit 106. Variants are possible as well.

The flexible tubing 104 to be used with the tubing connector system 100 will generally be made of a polymeric material, such as a transparent or translucent plastic material. Nevertheless, variants are possible as well.

The flexible tubing 104 has an inner diameter and an outer diameter. The inner diameter forms an internal channel extending over the entire length of the flexible tubing 104. The end portion 102 is connected to the tubing connector system 100 by inserting the tubing fixation portion 160 inside the end portion 102, as best shown in FIG. 3. The tubing fixation portion 160 has a slightly larger diameter than the inner diameter of the flexible tubing 104 and this creates a frictional engagement. This will also slightly expand the outer diameter of the flexible tubing 104.

In the illustrated example, the end portion 102 of the flexible tubing 104 is maintained firmly over the tubing fixation portion 160 using a slide clamp 190. The slide clamp 190 includes an annular sleeve portion 192 and a plug portion 194. The sleeve portion 192 and the plug portion 194 of the illustrated slide clamp 190 are interconnected through a substantially cylindrical intervening portion. The illustrated slide clamp 190 has a monolithic construction and has no moving parts. It can be made of a plastic material using an injection-molding process where all portions are molded together at the same time. Variants are possible as well.

The sleeve portion 192 has a tapered inner peripheral wall surface. It is easily slidingly insertable over the unexpanded outer diameter of the flexible tubing 104. The slide clamp 190 is also removably positionable proximate the end portion 102 of the flexible tubing 104, when inserted over the tubing fixation portion 160, to constrict the end portion 102 in a withdrawal-resisting frictional engagement with the tubing fixation portion 160. This way, the end portion 102 will be squeezed onto the tubing fixation portion 160. The slide clamp 190 can be moved by hand into position, for instance upon rotating it and progressively moving it at the same time. Variants are possible as well.

The tapered inner peripheral surface of the sleeve portion 192 varies between a minimum inner diameter and a maximum inner diameter. The inner diameter of the tapered inner peripheral surface is maximum at opposite side edges of the sleeve portion 192 and the inner diameter is minimum in-between the opposite side edges. The minimum inner diameter is preferably equal or more than the unexpanded outer diameter of the flexible tubing 104 so that the slide clamp 190 can be easily moved along the outer surface of the flexible tubing 104. However, the minimum inner diameter is less than the expanded outer diameter of the flexible tubing 104 for generating the withdrawal-resisting frictional engagement.

The plug portion 194 of the slide clamp 190 includes a tapered outer peripheral wall surface on which the end portion 102 of the flexible tubing 104 can be removably inserted to sealingly close it when needed, for instance during and/or after the annual cleaning/sanitization. It can also allow the end portion 102 of the flexible tubing 104 to be closed during the sap harvesting season if the flexible tubing 104 needs to be removed for some reason, such as for repairs, reconfiguration of the network and/or to clear a passage for a vehicle. Other situations exist. Another interesting feature is that the operator can remove some portions of the network of conduits and transport them elsewhere in the sugar bush while keeping the interior of the flexible tubings 104 clean and sealed.

With the slide clamp 190, removing the end portion 102 of the flexible tubing 104 can be done easily by rotating the slide clamp 190 and moving it at the same time away from the tip of the end portion 102. Once the slide clamp 190 is further away, the force created to squeeze the end portion 102 will be lower and the end portion 102 will detach relatively easily, for instance by moving the flexible tubing 104 sideways to create an angle with the center axis of the tubing fixation portion 160. Since serrations can be omitted, the withdrawal of the end portion 102 will require less force and the damages to the end portions 102 due to its insertion on the tube fitting 150 will generally be minor. Using the same end portion 102 once again will be possible. Conventional serrations generally tend to be larger in diameter in most designs. The use of the slide clamp 190 mitigates a premature plastic deformation of the flexible tubings 104 as often experienced with conventional serrations. Damages caused by conventional serrations may force operators to cut the end portions 102 so as to create a fresh one. However, this progressively shortens the flexible tubings over the years. Conventional serrations may also force operators to cut the end portions 102 simply because they are too difficult from detaching. While using conventional serrations on the tube fitting 150 is not excluded, using a configuration involving the slide clamp 190 is preferable.

In use, once the tapping hole 108 is made on the main conduit 106, the operator inserts the tip of the tapping hole engaging portion 162 into the tapping hole 108. At this point, the tube fitting 150 is already inserted through the band opening 140 or the screw-type clamp 120 is inserted over the tube fitting 150 immediately thereafter. If not already closed, the screw-type clamp 120 is closed and then tightened. The inner side face of the band 124 will be substantially circular in shape. The area around the band opening 140 will push over the outer side face of the flange 170, forcing it into a shape matching that of the outer wall surface under it. The flange 170 was initially substantially flat but the area around the band opening 140 will curve the flange 170. The curvature of the flange 170 is automatically tailored to match of the curvature of the outer wall surface, regardless of the diameter of the main conduit 106.

As shown in FIG. 1, the gasket 180 is positioned between the inner side face of the flange 170 and the outer wall surface of the main conduit 106. Tightening the band 124 will also force the gasket 180 in having a similar shape as the flange 170. Such shape greatly improves the sealing engagement. Also, since only a single screw-type clamp 120 is used, the radial pressure is centered and concentrated at the right place. The sealing attachment can be created very quickly, even by an unexperienced operator, using parts that are relatively inexpensive and simple.

In the illustrated example, the flange 170 will return to its substantially flat initial position when the tension in the band 124 will be released since the flange 170 is made of a resilient material. Variants are possible as well.

Moreover, no air will enter the tubing network during the operation even under high or very high vacuum conditions because of the design of the tubing connector system 100. It was found that this mitigates the risks of contaminations. It also mitigates freezing of sap when outside temperatures that are slightly below the freezing point. The sap can continue to flow down to a few degrees Celsius below zero when air is prevented from entering the network through very small interstices. The tubing connector system 100 provides a very good sealing at each of the connections and these small air infiltrations can be eliminated if the tubing connector system 100 is designed and used properly. Thus, contamination is prevented and sap can be harvested at lower temperatures than ever before.

The various parts of the tubing connector system 100 can be used on a permanent sap collecting system (where most of the hardware will remain in the forest during the off-season), or on a sap collecting system where most of the hardware are removed at the end of each sap harvesting season. The tubing connector system 100 is thus very versatile.

Figure 8:
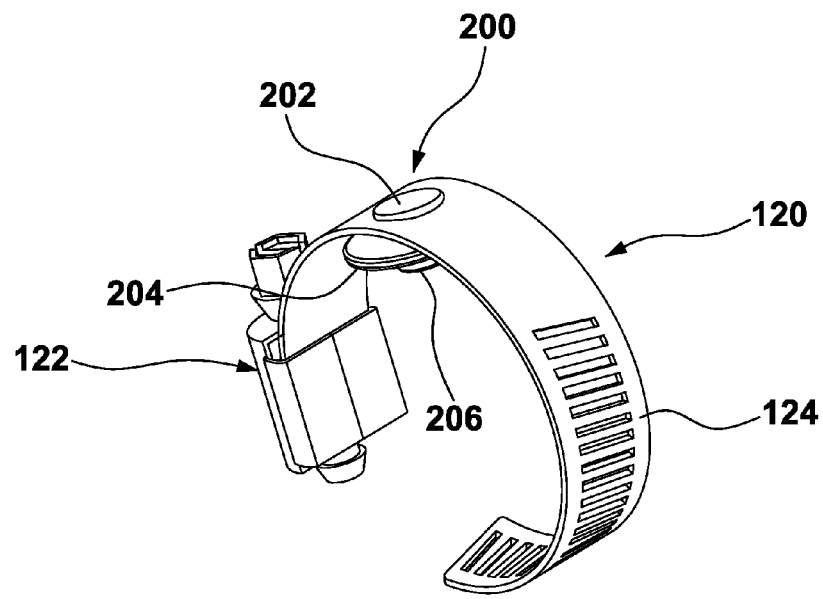
FIG. 8 is an isometric side view of an example of a screw-type clamp provided with a closing plug member.

FIG. 8 is an isometric side view of an example of a screw-type clamp 120 provided with a closing plug member 200. In this example, the screw-type clamp 120 is identical to the one used in FIG. 1. The closing plug member 200 can be used to seal an unused tapping hole 108, for instance a tapping hole that is no longer useful and/or a tapping hole from which the end portion 102 of the corresponding flexible tubing 104 was detached during the off-season. Still, it is possible to repair a localized damage on the main conduit 106 using this assembly. The closing plug member 200 replaces the tube fitting 150 and is used together with the gasket 180. The closing plug member 200 has a top circular section 202 that can be set inside the band opening 140, a middle circular section 204 of larger diameter around which the gasket 180 is set, an a bottom circular section 206 than can be inserted tightly inside the tapped hole 108. The closing plug member 200 can be made of a monolithic piece. One can substitute the tube fitting 150 for the closing plug member 200 in the tubing connector system 100 by pulling the tube fitting 150 out of the band opening 140 and inserting the closing plug member 200 in place.

Figure 9:
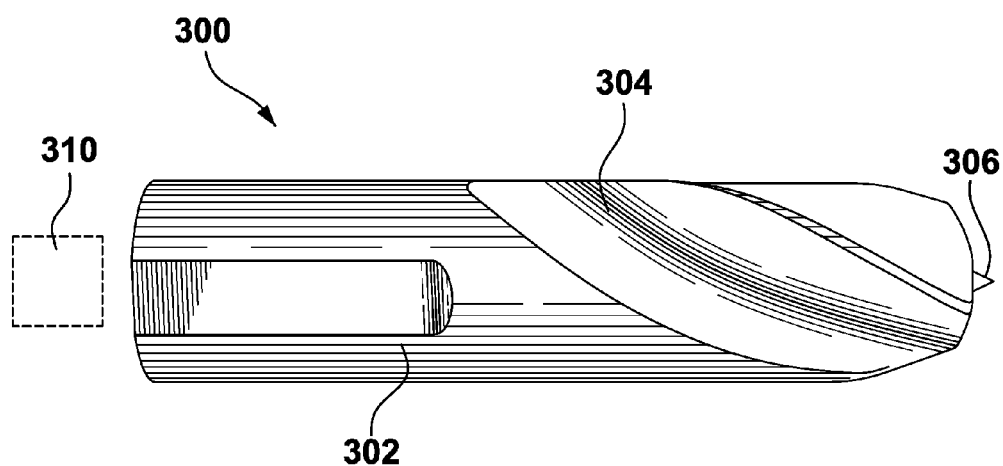
FIG. 9 is a side view of an example of a drill bit for machining a tapping hole on a main conduit.
Figure 10:
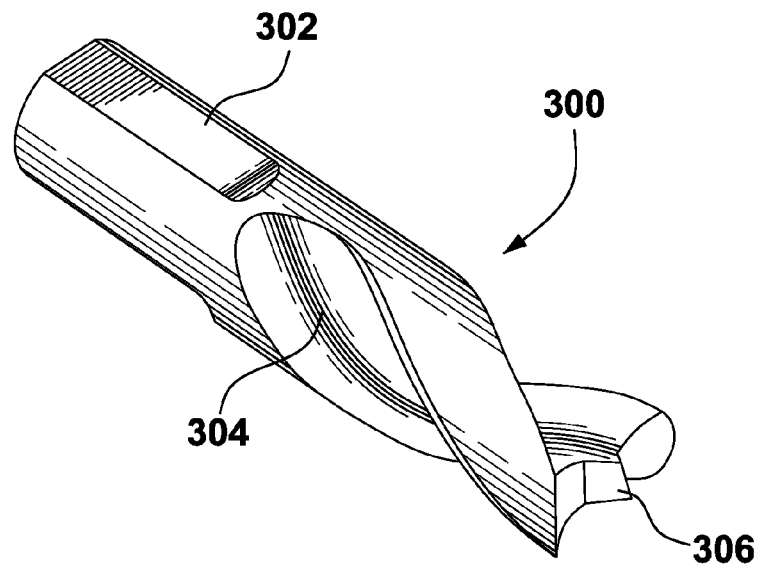
FIG. 10 is a front isometric view of the drill bit in FIG. 9.
Figure 11:
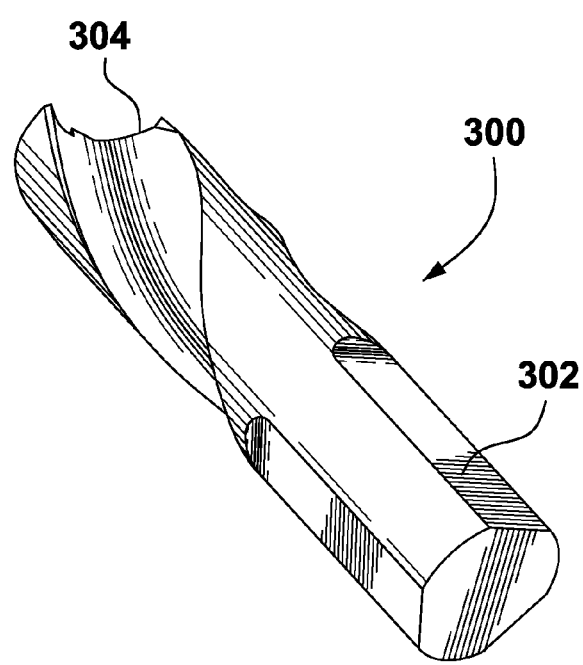
FIG. 11 is a rear isometric view of the drill bit in FIG. 9.

FIG. 9 is a side view of an example of a drill bit 300 for machining a tapping hole 108 on the main conduit 106. FIG. 10 is a front isometric view of the drill bit 300 in FIG. 9. FIG. 11 is a rear isometric view of the drill bit 300 in FIG. 9. The drill bit 300 is made of metal. It includes a mounting portion 302 and a drilling portion on which are provided two complementary helical grooves 304. As can be seen, the drill bit 300 is made relatively short to prevent an operator from accidentally drilling too far and thereby creating a second hole through the wall of the main conduit 106. The length of the drill bit 300 extending out of the mandrel of the power tool is less than the inner diameter of the main conduit 106. The power tool that is schematically shown in FIG. 9 at 310 can be, for instance, a battery-operated handheld power drill. Variants are possible as well.

The illustrated drill bit 300 also includes a sharp point 306 at its tip to facilitate the initial positioning of the drill bit 300 on the wall surface when the tapping hole 108 is being made.

The present detailed description and the appended figures are meant to be exemplary only, and a skilled person will recognize that variants can be made in light of a review of the present disclosure without departing from the proposed concept.

LIST OF REFERENCE NUMERALS 100 tubing connector system
102 end portion
104 flexible tubing
106 main conduit
108 tapping hole
120 screw-type clamp
122 adjustable tension mechanism
124 flexible band
130 housing
132 screw
134 slot
140 band opening
150 tube fitting
152 first tube section
154 second tube section
160 tubing fixation portion
162 tapping-hole engaging portion
170 flange
180 gasket
182 inner section
184 outer section
186 annular groove (of the flange)
188 annular groove (of the gasket)
190 slide clamp
192 sleeve portion
194 plug portion
200 closing plug member
202 top circular section
204 middle circular section
206 bottom circular section
300 drill bit
302 mounting portion
304 helical groove
306 sharp point
310 battery-operated handheld power drill

What is claimed is:

1. A tubing connector system for providing a removable air-tight and water-tight sealing connection under high vacuum conditions between an end portion of a flexible tubing and a tapping hole on a main conduit, the tubing connector system including:

a single clamp having an adjustable tension mechanism and a flexible band cooperating with the adjustable tension mechanism, the band forming a circular loop encompassing the main conduit and having opposite inner and outer side faces, the clamp including an opening, extending between the inner and outer side faces of the band, to be positioned in registry with the tapping hole;

a tube fitting forming an internal fluid circuit extending between a tubing fixation portion, over which the end portion of the flexible tubing can be removably inserted with a frictional engagement, and a tapping-hole engaging portion, opposite the tubing fixation portion, and that can be brought into cooperative engagement with an inner peripheral surface of the tapping hole, the tube fitting including a deformable surrounding flange extending radially outward and located adjacent to the tapping-hole engaging portion, the flange having inner and outer side faces with the outer side face being engageable by an area on the inner side face of the band that surrounds the band opening, the flange being larger in width than the band opening;

a resilient gasket to be interposed between an outer wall surface of the main conduit and the inner side face of the flange to seal a space immediately surrounding the tapping-hole engaging portion when brought into cooperative engagement with the tapping hole inner periphery; and a slide clamp to constrict the end portion of the flexible tubing in a withdrawal-resisting frictional engagement with the tubing fixation portion, the slide clamp including an annular sleeve portion and a plug portion.

2. A tubing connector system for use between an end portion of a flexible tubing and a tapping hole on a main conduit, the tubing connector system including:

a single clamp having an adjustable tension mechanism and a flexible band cooperating with the adjustable tension mechanism, the band having an opening to be positioned in registry with the tapping hole, the opening extending between inner and outer side faces of the band, the adjustable tension mechanism including a housing that is rigidly attached over the band and the housing pivotally supporting a worm screw disposed tangentially with reference to the band, the band being wrapped around the main conduit and then closed by inserting an end of the band through the housing and into engagement with the worm screw to form a circular loop encompassing the outer wall surface of the main conduit;

a monolithic tube fitting forming an internal fluid circuit extending between a tubing fixation portion, over which the end portion of the flexible tubing can be removably inserted with a frictional engagement, and a tapping-hole engaging portion, opposite the tubing fixation portion, which includes a projecting tip part that can be brought into cooperative engagement with an inner peripheral surface of the tapping hole, the tube fitting including a resiliently-deformable flange extending outward and surrounding an outer surface of the tube fitting, the flange having inner and outer side faces with the outer side face being engageable by an area on the inner side face of the band that surrounds the band opening, the flange being larger in width than the band opening; and a resilient gasket to be interposed between an outer wall surface of the main conduit and the inner side face of the flange to seal a space immediately surrounding the tapping-hole engaging portion when brought into cooperative engagement with the inner peripheral surface of the tapping hole.

3. The tubing connector system as defined in claim 2, wherein the tube fitting includes first and second tube sections, the tubing fixation portion being located at an open end of the first tube section and the tapping-hole engaging portion being located at an open end of the second tube section, the flange being provided on the second tube section and being spaced apart from the open end of the second tube section.

4. The tubing connector system as defined in claim 3, wherein the first tube section and the second tube section, up to its flange, are smaller in width than the band opening.

5. The tubing connector system as defined in claim 3, wherein the first tube section and the second tube section are disposed substantially perpendicularly from one another.

6. The tubing connector system as defined in claim 2, wherein the gasket is annular in shape, the gasket including an inner section and an outer section that are coaxially disposed around a center axis, the inner section having a projecting portion on one side that fits into an annular centering groove made on the inner side face of the flange.

7. The tubing connector system as defined in claim 6, wherein the gasket includes a plurality of concentric annular grooves on an inner side to enhance sealing engagement with the outer wall surface on the main conduit.

8. The tubing connector system as defined in claim 2, further including a closing plug member substituting the tube fitting to close the tapping hole.

9. The tubing connector system as defined in claim 8, wherein the closing plug member includes a top circular section fitting inside the band opening, a middle circular section of larger diameter around which the gasket fits, and a bottom circular section to be inserted inside the tapping hole.

10. The tubing connector system as defined in claim 2, further including a drill bit for making the tapping hole using a power tool, the drill bit having a drilling portion that is shorter in length than an inner diameter of the main conduit and including a sharp point projecting beyond a tip of the drilling portion to facilitate the initial positioning of the drill bit on the outer wall surface of the main conduit when the tapping hole is made.

11. The tubing connector system as defined in claim 2, wherein the tapping-hole engaging portion includes a tapered-shaped outer surface.

12. A tubing connector system for use between an end portion of a flexible tubing and a tapping hole on a main conduit, the tubing connector system including:

a single clamp having an adjustable tension mechanism and a flexible band, the adjustable tension mechanism including a housing that is rigidly attached to the band and the housing pivotally supporting a worm screw disposed tangentially with reference to the band, the band being wrapped around the main conduit and passing through the housing while engaging the worm screw to form an adjustable circular loop encompassing the main conduit, the band having an opening to be positioned in registry with the tapping hole, the band opening extending between inner and outer side faces of the band;

a tube fitting forming an internal fluid circuit extending between a tubing fixation portion, over which the end portion of the flexible tubing can be removably inserted with a frictional engagement, and a tapping-hole engaging portion, opposite the tubing fixation portion, and that can be brought into cooperative engagement with an inner peripheral surface of the tapping hole, the tube fitting including a deformable surrounding outer flange, the flange having inner and outer side faces with the outer side face being engageable by an area on the inner side face of the band that surrounds the band opening, the flange being larger in width than the band opening; and a resilient gasket to be interposed between an outer wall surface of the main conduit and the inner side face of the flange to seal a space immediately surrounding the tapping-hole engaging portion when brought into cooperative engagement with the inner peripheral surface of the tapping hole.

13. The tubing connector system as defined in claim 12, wherein the band opening is substantially circular and at least equal in diameter to the tapping hole, the band opening being smaller in width than the band.

14. The tubing connector system as defined in claim 12, wherein the flange is resiliently deformable.

15. The tubing connector system as defined in claim 12, further including a closing plug member substituting the tube fitting to close the tapping hole.

16. The tubing connector system as defined in claim 15, wherein the closing plug member includes a top circular section fitting inside the band opening, a middle circular section of larger diameter around which the gasket fits, and a bottom circular section to be inserted inside the tapping hole.

17. The tubing connector system as defined in claim 12, wherein the tube fitting is a monolithic piece.

18. The tubing connector system as defined in claim 12, wherein the gasket is annular in shape, the gasket including an inner section and an outer section that are coaxially disposed around a center axis, the inner section having a projecting portion on one side that fits into an annular centering groove made on the inner side face of the flange.

19. The tubing connector system as defined in claim 18, wherein the gasket includes a plurality of concentric annular grooves on an inner side to enhance sealing engagement with the outer wall surface on the main conduit.

20. A tubing connector system for use between an end portion of a flexible tubing and a tapping hole on a main conduit, the tubing connector system including:
- a single clamp having an adjustable tension mechanism and a flexible band cooperating with the adjustable tension mechanism, the band having an opening to be positioned in registry with the tapping hole, the opening extending between inner and outer side faces of the band;
- a monolithic tube fitting forming an internal fluid circuit extending between a tubing fixation portion, over which the end portion of the flexible tubing can be removably inserted with a frictional engagement, and a tapping-hole engaging portion, opposite the tubing fixation portion, which includes a projecting tip part that can be brought into cooperative engagement with an inner peripheral surface of the tapping hole, the tube fitting including a resiliently-deformable flange extending outward and surrounding an outer surface of the tube fitting, the flange having inner and outer side faces with the outer side face being engageable by an area on the inner side face of the band that surrounds the band opening, the flange being larger in width than the band opening; and
- a resilient gasket to be interposed between an outer wall surface of the main conduit and the inner side face of the flange to seal a space immediately surrounding the tapping-hole engaging portion when brought into cooperative engagement with the inner peripheral surface of the tapping hole, the gasket being annular in shape, the gasket including an inner section and an outer section that are coaxially disposed around a center axis, the inner section having a projecting portion on one side that fits into an annular centering groove made on the inner side face of the flange.

21. The tubing connector system as defined in claim 20, wherein the gasket includes a plurality of concentric annular grooves on an inner side to enhance sealing engagement with the outer wall surface on the main conduit.

* * * * *